(12) United States Patent
Sasaki et al.

(10) Patent No.: US 10,784,491 B2
(45) Date of Patent: Sep. 22, 2020

(54) BATTERY TERMINAL

(71) Applicant: Yazaki Corporation, Tokyo (JP)

(72) Inventors: Toshiya Sasaki, Shizuoka (JP); Takashi Yoshida, Shizuoka (JP); Takayuki Kato, Shizuoka (JP); Hideto Yoshinaga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 6 days.

(21) Appl. No.: 15/698,063

(22) Filed: Sep. 7, 2017

(65) Prior Publication Data

US 2018/0076436 A1 Mar. 15, 2018

(30) Foreign Application Priority Data

Sep. 12, 2016 (JP) ................. 2016-177298

(51) Int. Cl.
*H01M 2/30* (2006.01)
*H01M 2/34* (2006.01)
*H01R 11/28* (2006.01)

(52) U.S. Cl.
CPC ............. *H01M 2/30* (2013.01); *H01M 2/305* (2013.01); *H01M 2/34* (2013.01); *H01R 11/283* (2013.01); *H01R 11/287* (2013.01)

(58) Field of Classification Search
CPC .......... H01M 2/30; H01M 2/34; H01M 2/305; H01R 11/283; H01R 11/287
See application file for complete search history.

(56) References Cited

U.S. PATENT DOCUMENTS

| 9,419,267 | B2 | 8/2016 | Uematsu | |
|---|---|---|---|---|
| 2013/0252050 | A1* | 9/2013 | Uematsu | ............... H01R 11/287 429/91 |

FOREIGN PATENT DOCUMENTS

| CN | 103222116 A | 7/2013 |
|---|---|---|
| JP | 2009-168723 A | 7/2009 |
| JP | 2010-160990 A | 7/2010 |
| JP | 2011-134519 A | 7/2011 |
| JP | 2012-109098 A | 6/2012 |

* cited by examiner

*Primary Examiner* — Basia A Ridley
*Assistant Examiner* — Heng M. Chan
(74) *Attorney, Agent, or Firm* — Kenealy Vaidya LLP (57) ABSTRACT

A battery terminal includes a main body in which a battery post is inserted and a fastener having a pair of fastening abutting portions. The main body has a notch portion provided in at least an end in a fastening direction, accommodating and positioning one of the pair of fastening abutting portions. An abutting-portion-side opposite surface on the fastening abutting portion side and a notch-portion-side opposite surface on the notch portion side have respective abutting surfaces. A relief surface is provided on at least one of the abutting-portion-side opposite surface and the notch-portion-side opposite surface such that a relief space is formed with a clearance from the other one of the opposite surfaces.

2 Claims, 5 Drawing Sheets

FIG.6

BATTERY TERMINAL

CROSS-REFERENCE TO RELATED APPLICATION(S)

The present application claims priority to and incorporates by reference the entire contents of Japanese Patent Application No. 2016-177298 filed in Japan on Sep. 12, 2016.

BACKGROUND OF THE INVENTION

1. Field of the Invention

The present invention relates to a battery terminal.

2. Description of the Related Art

A conventional battery terminal disclosed in, for example, Japanese Patent Application Laid-open No. 2011-134519 includes a terminal main body including a post holding portion configured to hold a battery post vertically provided to a battery main body so as to fit onto the battery post, an electrical wire connection portion separately formed from the post holding portion and having an electrical wire connected thereto, and a rotation coupling portion rotatably coupling the electrical wire connection portion to the post holding portion.

There is room that the battery terminal described in Japanese Patent Application Laid-open No. 2011-134519 can be further improved in, for example, the fastening force to the battery post.

SUMMARY OF THE INVENTION

It is therefore an object of the present invention to provide a battery terminal capable of appropriately securing fastening force to a battery post.

In order to achieve the above mentioned object, a battery terminal according to one aspect of the present invention includes a main body that has a post insertion hole in which a battery post is inserted and a slit being continuous to the post insertion hole, and a fastener that has a pair of fastening abutting portions abutting and fastening the main body from both sides in a fastening direction interposing the slit along the fastening direction that is a direction intersecting with an axis direction of the battery post and crossing the slit, wherein the main body has a notch portion that is provided in at least an end in the fastening direction and accommodates and positions one of the pair of fastening abutting portions, in the fastening abutting portion and the notch portion, with the fastening abutting portion accommodated in the notch portion and positioned, an abutting-portion-side opposite surface on the fastening abutting portion side and a notch-portion-side opposite surface on the notch portion side are opposite to each other in the axis direction and an opposite direction intersecting with the fastening direction, and with the fastening abutting portion accommodated in the notch portion and positioned, the abutting-portion-side opposite surface and the notch-portion-side opposite surface are opposite to each other in a manner that the notch-portion-side opposite surface is positioned opposite to a post insertion hole side of the abutting-portion-side opposite surface in the opposite direction and form respective abutting surfaces abuttable with each other, and a relief surface is provided on at least one of the abutting-portion-side opposite surface and the notch-portion-side opposite surface such that a relief space is formed on a side opposite to the abutting surface with respect to the slit in the fastening direction with a clearance from another opposite surface.

According to another aspect of the present invention, in the battery terminal, the fastener may include a penetration member provided to the main body in a manner extended from an end of the main body to another end of the main body across the slit along the fastening direction, and one of the pair of fastening abutting portions is provided to an end of the penetration member.

According to still another aspect of the present invention, in the battery terminal, the notch portions may be formed on respective ends on both sides in the fastening direction of the main body, and the relief surface may be provided on the notch-portion-side opposite surface of the notch portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of the present invention will now be described with reference to the drawings. It should be noted that the embodiments are not intended to limit the scope of the present invention. Components in the following embodiments include matters replaceable by the skilled person in a simple manner or substantially the same.

Embodiment

A battery terminal 1 according to the embodiment illustrated in FIGS. 1 to 4 is assembled to a battery post 51 of a battery 50. The battery terminal 1 is assembled to the battery post 51 and electrically connects the battery 50 with, for example, a connection terminal 52. The battery 50 is mounted on a vehicle or the like as a capacitor. The battery 50 has the battery post 51 vertically provided on a surface of a battery housing 53 accommodating a battery fluid and various parts configuring the battery 50, typically on the top surface of the battery housing 53 in the vertical upward direction with the battery 50 mounted on the vehicle. The battery post 51 projects upward in the vertical direction from the top surface in the vertical direction of the battery housing 53. The battery post 51 is cylindrically formed, more specifically, formed in a cylindrical shape (or in a hollow cylindrical shape) tapered with a diameter decreasing toward a front end. The battery post 51 is tapered with the front end having a smaller outer diameter than the outer diameter of the based end. Furthermore, the battery post 51 is disposed with a center axis C thereof arranged along the vertical direction. The battery terminal 1 is fastened to the thus-configured battery post 51. The connection terminal 52 is a connection counterpart provided to an end of an electrical wire on the main body side of a vehicle or the like having the battery 50 mounted thereon.

A direction along the center axis C of the battery post 51 will be referred to as an axis direction X. For convenience, one of two directions perpendicular to the axis direction X will be referred to as a first width direction Y, whereas the other direction will be referred to as a second width direction Z. The first width direction Y corresponds to a later-described fastening direction, whereas the second width direction Z corresponds to a later-described opposite direction. The axis direction X, the first width direction Y, and the second width direction Z are arranged perpendicular to one another.

Figure 1:
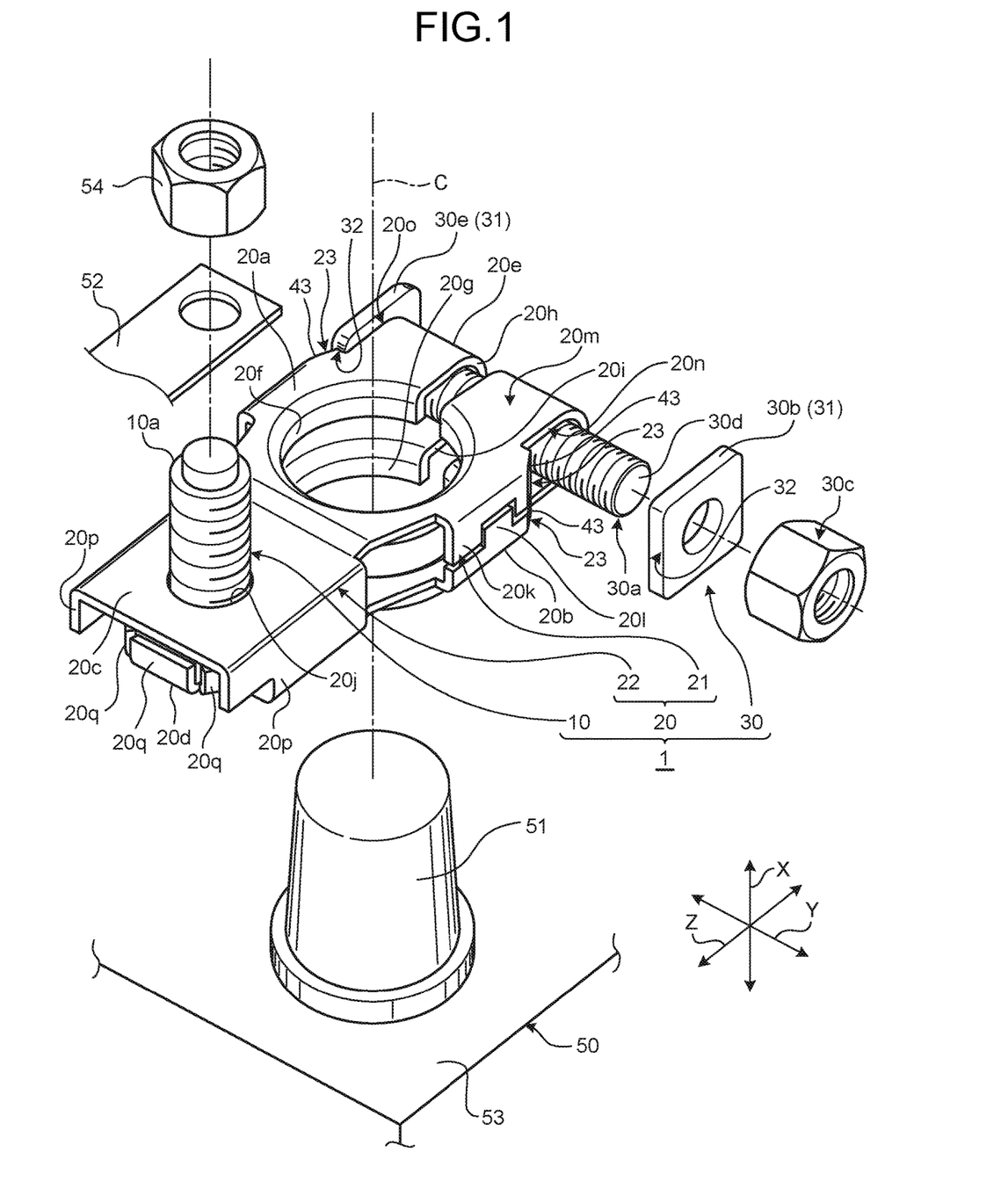
FIG. 1 is an exploded perspective view that schematically illustrates a configuration of a battery terminal according to an embodiment.
Figure 2:
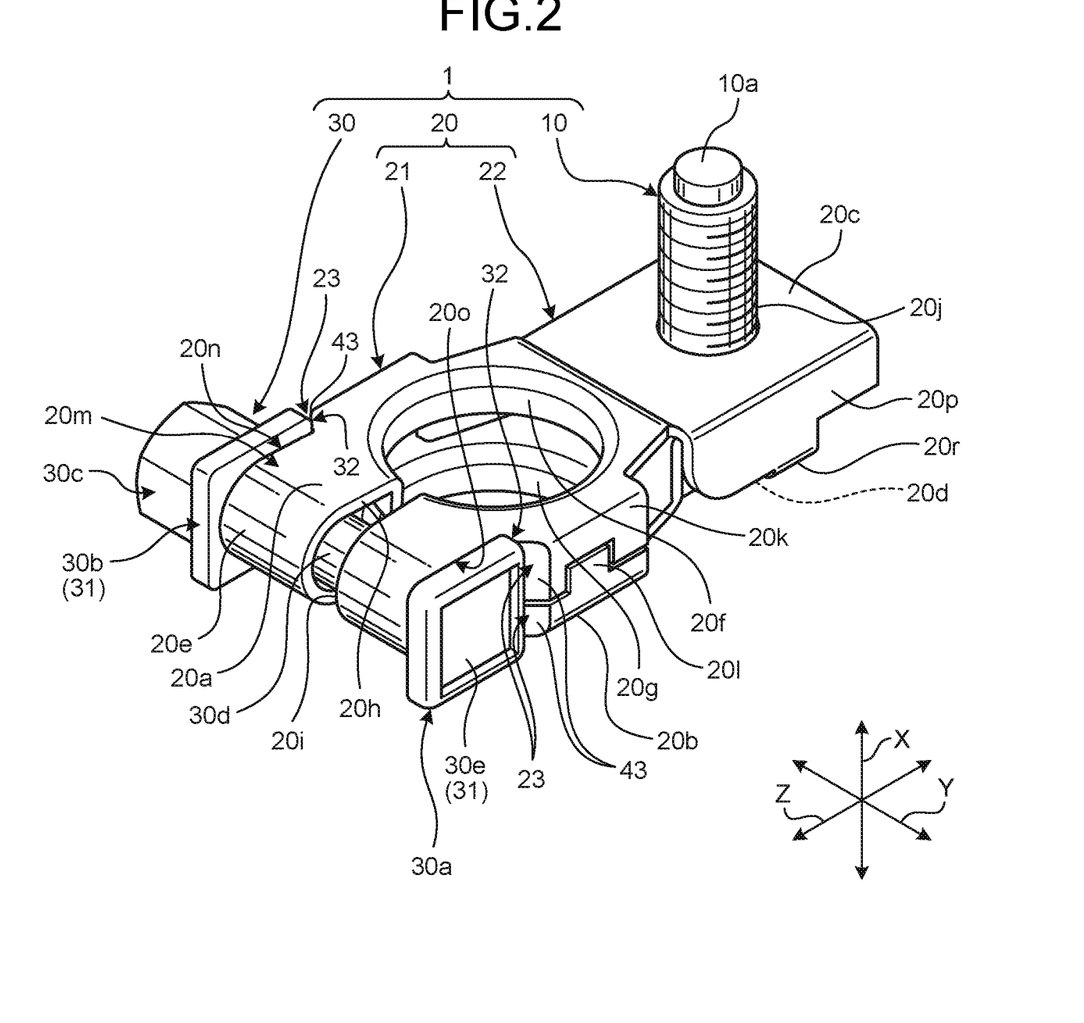
FIG. 2 is a perspective view that schematically illustrates the configuration of the battery terminal according to the embodiment.
Figure 3:
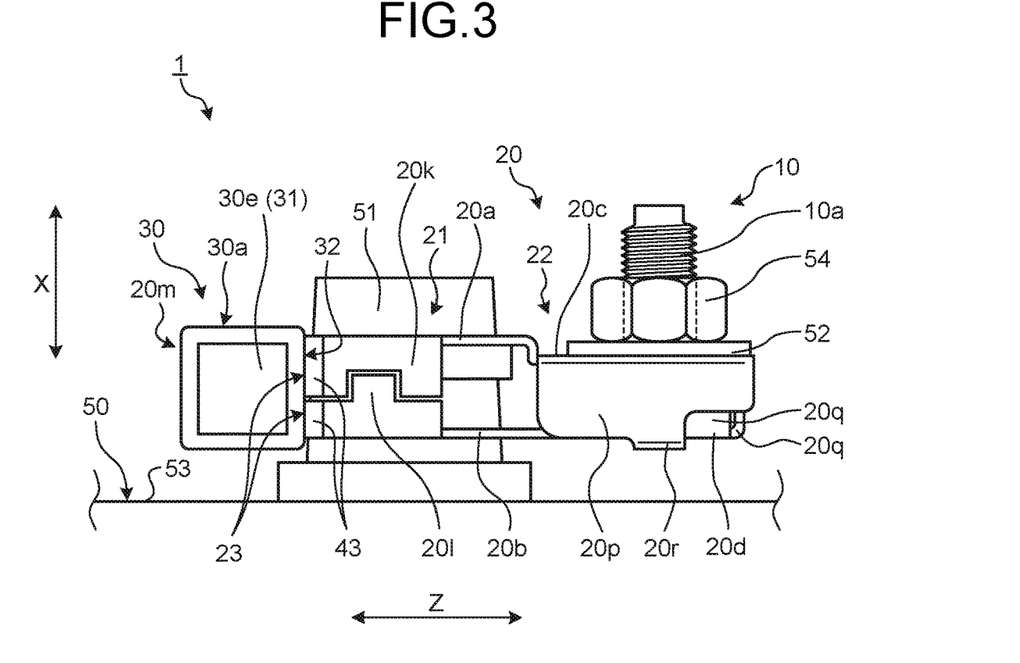
FIG. 3 is a side view that schematically illustrates the configuration of the battery terminal according to the embodiment.
Figure 4:
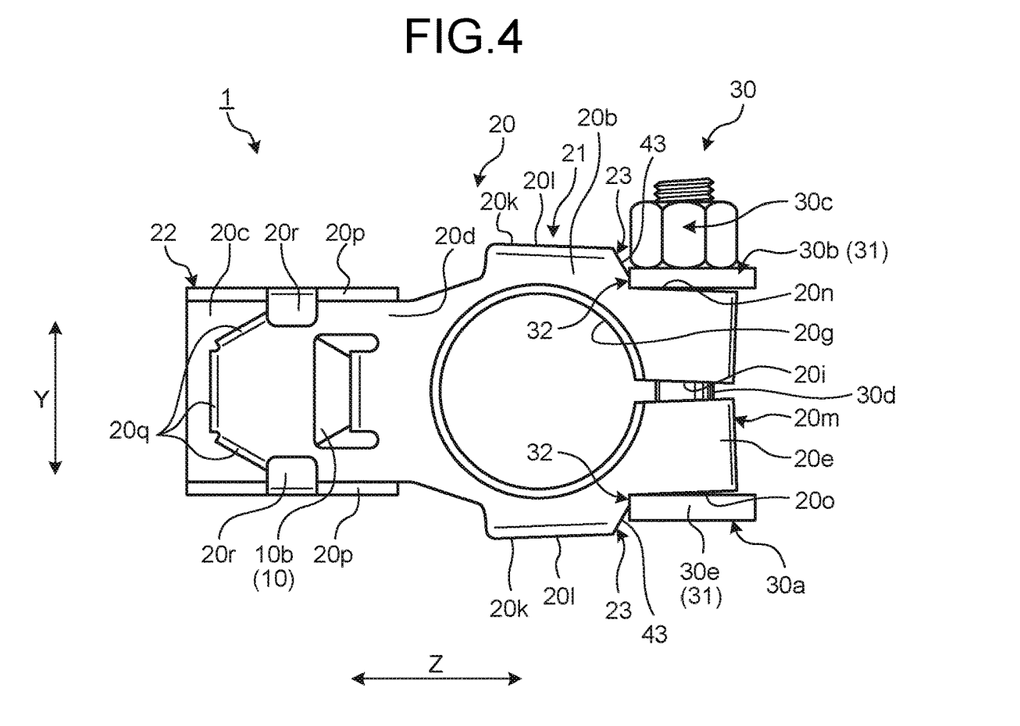
FIG. 4 is a back view that schematically illustrates the configuration of the battery terminal according to the embodiment.

The battery terminal 1 includes a stud bolt 10 serving as a connection member, a main body 20, and a fastener 30.

The stud bolt 10 includes a shaft portion 10a having the connection terminal 52 connected thereto and a bolt head 10b (particularly see FIG. 4) serving as a base portion provided to an end of the shaft portion 10a. The shaft portion 10a is formed in a cylindrical shape and has screw grooves formed on the outer peripheral surface. The bolt head 10b is a base portion on which the shaft portion 10a stands. The bolt head 10b has a larger diameter than that of the shaft portion 10a and is formed in a substantially hexagonal shape in this embodiment.

The main body 20 includes a post fastening unit 21 fastened to the battery post 51 and a bolt retaining unit 22 as a connection member retaining unit connected with the post fastening unit 21 and retaining the stud bolt 10. The main body 20 is formed with a pair of annular portions 20a and 20b that constitutes the post fastening unit 21, a pair of retaining board portions 20c and 20d that constitutes the bolt retaining unit 22, and a bent connection portion 20e, which are integrally formed by, for example, pressing and bending a conductive metal plate.

The pair of annular portions 20a and 20b is formed in substantially rectangular annular shapes and is formed with substantially circular post insertion holes 20f and 20g in which the battery post 51 is disposed and slits (gaps) 20h and 20i continuous to the post insertion holes 20f and 20g.

The pair of retaining board portions 20c and 20d is formed in substantially rectangular shapes, and a substantially circular bolt insertion hole 20j in which the shaft portion 10a of the stud bolt 10 is disposed is formed in the retaining board portion 20c side. The retaining board portion 20c is integrally formed with the annular portion 20a in a continuous manner, whereas the retaining board portion 20d is integrally formed with the annular portion 20b in a continuous manner.

The annular portion 20a and the annular portion 20b are integrally formed such that respective ends opposite to the ends having the retaining board portions 20c and 20d are continuous to each other through the bent connection portion 20e. With this formation, the main body 20 is formed in a manner folded in a U-shape with the bent connection portion 20e interposed therebetween. In the main body 20, a set of the annular portion 20a and the retaining board portion 20c and a set of the annular portion 20b and the retaining board portion 20d are opposite to each other in the axis direction X, and in each set, the portions are vertically stacked on one over the other in a plate-like shape in substantially parallel with each other.

The state where the parts are vertically stacked on one over the other typically corresponds to a state where the parts are stacked on one over the other along the axis direction X of the battery post 51 with the battery terminal 1 assembled to the battery post 51. The direction of stack typically corresponds to a direction along the axis direction X with the battery terminal 1 assembled to the battery post 51. In this case, a side where the shaft portion 10a of the stud bolt 10 projects is referred to as an upper side in a stack direction, and the opposite side is referred to as a lower side in the stack direction. The upper side in the stack direction corresponds to the front end side of the battery post 51, whereas the lower side in the stack direction corresponds to the base end side of the battery post 51. In the main body 20, specifically, the annular portion 20a and the retaining board portion 20c are disposed in the upper side in the stack direction, whereas the annular portion 20b and the retaining board portion 20d are disposed in the lower side in the stack direction.

In a state where the pair of annular portions 20a, 20b are vertically stacked on one over the other through the bent connection portion 20e, the pair of annular portions 20a and 20b defines the post insertion hole 20f and the post insertion hole 20g in a positional relationship opposite to each other in the stack direction. The post insertion hole 20f and the post insertion hole 20g have the respective inner peripheral surfaces formed by folding metal plates in the same direction, which is, in this case, in the downward direction. The post insertion hole 20f and the post insertion hole 20g have the respective inner peripheral surfaces tapered in a manner corresponding to the above-described taper of the battery post 51. More specifically, of the post insertion hole 20f and the post insertion hole 20g, a side having the shaft portion 10a of the stud bolt 10 projecting therefrom, which is the post insertion hole 20f side, has the smallest inner diameter. The other side, which is the post insertion hole 20g side, has the largest inner diameter. The post insertion hole 20f and the post insertion hole 20g have the respective inner peripheral surfaces coming into contact with the battery post 51 with the battery post 51 disposed therein. The pair of annular portions 20a and 20b has respective peripheral edges between the bent connection portion 20e and the pair of retaining board portions 20c and 20d folded toward each other. In this configuration, respective folded portions 20k and 20l formed in concave and convex shapes are engaged with each other.

With the pair of annular portions 20a and 20b vertically stacked on one over the other with the bent connection portion 20e interposed therebetween, the pair of annular portions 20a and 20b defines the slit 20h and the slit 20i in a positional relationship opposite to each other in the stack direction. The slit 20h and the slit 20i are continuous to each other at the bent connection portion 20e. As the entire shapes, on the bent connection portion 20e and the annular portions 20a and 20b, the slits 20h and 20i are extended from the bent connection portion 20e to the post insertion hole 20f and the post insertion hole 20g. In other words, the slits 20h and 20i are extended from the post insertion holes 20f and 20g to the bent connection portion 20e in a manner splitting parts of the annular portions 20a and 20b. The pair of annular portions 20a and 20b constitutes a fastened end 20m, an area from the post insertion holes 20f and 20g to the bent connection portion 20e fastened by the later-described fastener 30. The slits 20h and 20i penetrate through the fastened end 20m from the post insertion holes 20f and 20g to the bent connection portion 20e along the second width direction Z. The fastened end 20m has substantially rectangular notch portions 20n and 20o, each of which is mated with a part of the fastener 30, provided at respective ends on both sides in the first width direction Y.

The pair of retaining board portions 20c and 20d is fabricated by being bent with the shaft portion 10a of the stud bolt 10 preliminarily inserted in the bolt insertion hole 20j before the bending work and retains the stud bolt 10 in the state vertically stacked on one over the other with the bent connection portion 20e interposed therebetween. The retaining board portion 20c constitutes an upper board having the bolt insertion hole 20j serving as a through-hole through which the shaft portion 10a of the stud bolt 10 penetrates, and the retaining board portion 20d constitutes a lower board opposite to the retaining board portion 20c as the upper board in the stack direction (the axis direction X) and retaining the bolt head 10b of the stud bolt 10 between the retaining board portions 20c and 20d. The pair of retaining board portion 20c and the retaining board portion 20d is stacked on one over the other in a manner opposite to each other and retains the bolt head 10b therebetween. More specifically, the retaining board portion 20c and the retaining board portion 20d have respective folded portions 20p and 20q folded toward each other. The folded portions 20p are portions formed by folding respective ends on both sides in the first width direction Y of the retaining board portion 20c toward the retaining board portion 20d. The folded portions 20q are portions formed by folding parts of respective ends on both sides in the first width direction Y of the retaining board portion 20d and a front end (an end opposite to the annular portion 20b) in the second width direction Z of the retaining board portion 20d toward the retaining board portion 20c (particularly see FIG. 4 and other descriptions). The folded portions 20q are formed in a manner folded so as to surround the end surfaces of three sides of the substantially hexagonal bolt head 10b. The folded portions 20p are positioned outside the folded portions 20q in the first width direction Y. The retaining board portion 20c has claw portions 20r, each of which projects from a part of the front end of the corresponding folded portion 20p and folded toward the back surface (the side opposite to the bolt head 10b retaining side) of the retaining board portion 20d (particularly see FIG. 4 and other descriptions). On the bolt retaining unit 22 including the retaining board portions 20c and 20d, portions such as the folded portions 20p and 20q and the claw portions 20r are bent with the shaft portion 10a of the stud bolt 10 disposed in the bolt insertion hole 20j. In this configuration of the bolt retaining unit 22, the folded portions 20q of the retaining board portion 20d retain the bolt head 10b between the retaining board portion 20c and the folded portions 20q, and the claw portions 20r of the folded portions 20p of the retaining board portion 20c are bent toward the back surface of the retaining board portion 20d. With this configuration, the bolt retaining unit 22 retains the bolt head 10b of the stud bolt 10 between the retaining board portion 20c and the retaining board portion 20d in the direction in which the pair of retaining board portions 20c and 20d is stacked on one over the other.

The stud bolt 10 is retained between the retaining board portion 20c and the retaining board portion 20d, and in this state, the shaft portion 10a is exposed in a manner projecting from the bolt insertion hole 20j along the axis direction X. The stud bolt 10 has the shaft portion 10a exposed from the bolt insertion hole 20j electrically connected with the connection terminal 52. The stud bolt 10 has the connection terminal 52 fastened to the shaft portion 10a with a nut 54 serving as a fastening member screwed to the shaft portion 10a. In the above-described bolt retaining unit 22, with the nut 54 screwed onto the shaft portion 10a of the stud bolt 10, the retaining board portion 20c constituting the upper board is sandwiched between the nut 54 and the bolt head 10b of the stud bolt 10 along with the connection terminal 52.

The fastener 30 fastens a pair of annular portions 20a and 20b to the battery post 51 with the battery post 51 inserted in the post insertion holes 20f and 20g. The fastener 30 includes a bolt 30a, a washer 30b, and a nut 30c. The bolt 30a includes a shaft portion 30d serving as a penetration member to which the nut 30c is screwed and a bolt head 30e (particularly see FIG. 4 and other descriptions) serving as a base portion provided to an end of the shaft portion 30d. The shaft portion 30d is formed in a cylindrical shape and has screw grooves formed around the outer peripheral surface. The bolt head 30e is a base portion having the shaft portion 30d stand thereon. In other words, the bolt head 30e is integrally formed with the shaft portion 30d and provided to an end of the shaft portion 30d. The bolt head 30e has a larger diameter than that of the shaft portion 30d and is formed in a substantially rectangular plate shape in this embodiment.

The bolt 30a is inserted into the bent connection portion 20e from an end of the bent connection portion 20e in the first width direction Y with the shaft portion 30d crossing the slits (gaps) 20h and 20i. The shaft portion 30d of the bolt 30a is disposed in a space formed across the slits 20h and 20i between the pair of annular portions 20a and 20b vertically stacked on one over the other with the bent connection portion 20e interposed therebetween. In other words, the shaft portion 30d of the bolt 30a is placed in the annular portions 20a and 20b in a manner extended from respective ends of the annular portions 20a and 20b to the other respective ends of the annular portions 20a and 20b across the slits 20h and 20i along the first width direction Y. The first width direction Y corresponds to a direction crossing the slits 20h and 20i formed on the annular portions 20a and 20b and typically corresponds to a fastening direction for fastening the annular portions 20a and 20b with the fastener 30 in fastening the annular portions 20a and 20b to the battery post 51. With the shaft portion 30d disposed in the annular portions 20a and 20b in the above-described positional relation, the bolt 30a is positioned with the bolt head 30e mated with the notch portion 20o formed on the fastened end 20m of the main body 20 and accommodated in the notch portion 20o.

The washer 30b is formed in a substantially rectangular plate shape and is positioned by being mated with the notch portion 20n formed in the fastened end 20m of the main body 20 and accommodated in the notch portion 20n. The washer 30b is placed between the main body 20 and the nut 30c in the state accommodated in the notch portion 20n and positioned.

The nut 30c is screwed to a front end portion of the bolt 30a exposed from the other end of the bent connection portion 20e, in other words, to an end opposite to the bolt head 30e of the shaft portion 30d.

The battery terminal 1 configured as described above is assembled to the battery post 51 with the battery post 51 disposed in the post insertion holes 20f and 20g in the positional relationship with the shaft portion 10a of the stud bolt 10 exposed. In the battery terminal 1, the bent connection portion 20e and both respective ends of the annular portions 20a and 20b are fastened on the fastened end 20m in the directions of approach with the slits 20h and 20i interposed therebetween by fastening the bolt 30a and the nut 30c of the fastener 30 with the inner peripheral surfaces of the post insertion holes 20f and 20g and the outer peripheral surface of the battery post 51 contact with each other.

In the fastener 30, the bolt head 30e and the washer 30b constitute a pair of fastening abutting portions 31 with the shaft portion 30d of the bolt 30a provided in the annular portions 20a and 20b in the above-described positional relation and with the bolt head 30e of the bolt 30a and the washer 30b respectively accommodated in the notch portions 20o and 20n and positioned. The bolt head 30e constitutes one of the pair of fastening abutting portions 31, whereas the washer 30b constitutes the other of the pair of fastening abutting portions 31. In the fastener 30, the pair of fastening abutting portions 31 including the bolt head 30e and the washer 30b abuts the fastened end 20m of the main body 20 along the first width direction Y as a fastening direction from both ends in the first width direction Y with the slits 20h and 20i interposed therebetween. With the nut 30c screwed to an end opposite to the bolt head 30e of the shaft portion 30d, the fastener 30 has the pair of fastening abutting portions 31 fasten the fastened end 20m of the main body 20 along the first width direction Y from both ends in the first width direction Y toward the directions for narrowing the spaces of the slits 20h and 20i.

The battery terminal 1 is fastened to the battery post 51 by fastening force of the fastener 30 with decreases in the diameters of the post insertion holes 20f and 20g in the state where the inner peripheral surfaces of the post insertion holes 20f and 20g come in contact with the outer peripheral surface of the battery post 51. In the battery terminal 1, the connection terminal 52 is electrically connected to the shaft portion 10a of the stud bolt 10 and fixed by the nut 54. In the battery terminal 1, furthermore, the bent connection portion 20e and both respective ends of the annular portions 20a and 20b are loosened in the directions of separation with the slits 20h and 20i interposed therebetween by loosening the bolt 30a and the nut 30c of the fastener 30. The battery terminal 1 accordingly becomes detachable from the battery post 51 with increases in the diameters of the post insertion holes 20f and 20g.

As illustrated in FIGS. 1 to 5, with the above-described configuration of the fastener 30, the battery terminal 1 in this embodiment is intended to secure appropriate fastening force by forming a relief surface 43 on the abutting portion between the fastening abutting portion 31 and the notch portion 20n, 20o.

Figure 5:
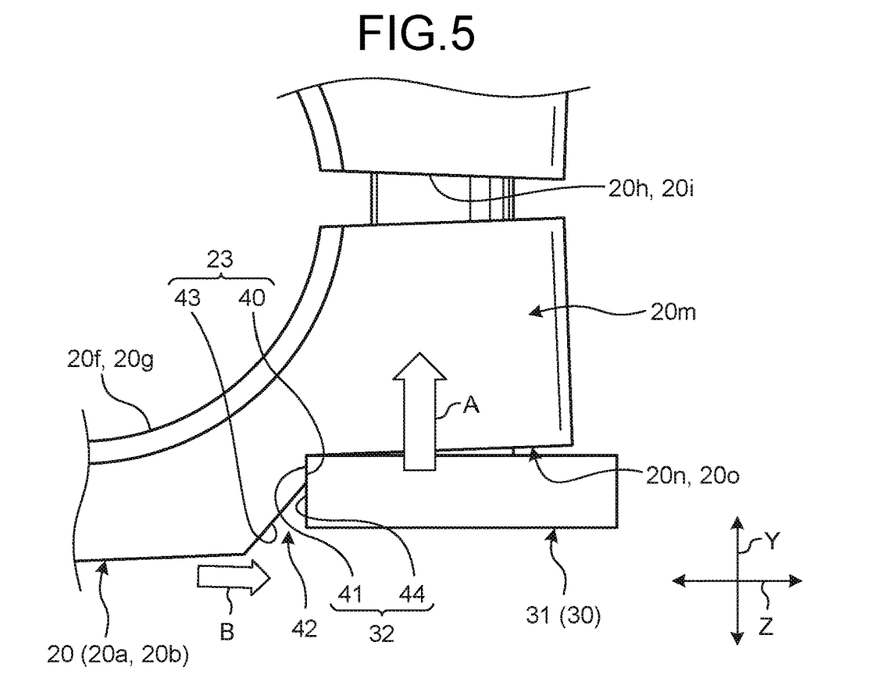
FIG. 5 is a partial planar view that includes a relief surface of the battery terminal according to the embodiment.

Specifically, the fastening abutting portion 31 and the notch portion 20n, 20o have a pair of opposite surfaces 23 and 32 opposite to each other in the second width direction Z with the fastening abutting portion 31 accommodated in the notch portion 20n, 20o and positioned. The second width direction Z is an opposite direction perpendicular to (intersecting with) the axis direction X and the first width direction Y. The opposite surface 23 constitutes a notch-portion-side opposite surface formed on the notch portion 20n, 20o side. The opposite surface 32 constitutes an abutting-portion-side opposite surface formed on the fastening abutting portion 31 side. Of the opposite surface 23 and the opposite surface 32, the opposite surface 23 is positioned opposite to the post insertion hole 20f, 20g side of the opposite surface 32 in the second width direction Z with the fastening abutting portion 31 accommodated in the notch portion 20n, 20o and positioned. In this configuration, four pairs of opposite surfaces 23 and 32 include: (1) a pair of opposite surfaces 23 and 32 between the annular portion 20a and the fastening abutting portion 31 including the bolt head 30e, (2) a pair of opposite surfaces 23 and 32 between the annular portion 20b and the fastening abutting portion 31 including the bolt head 30e, (3) a pair of opposite surfaces 23 and 32 between the annular portion 20a and the fastening abutting portion 31 including the washer 30b, and (4) a pair of opposite surfaces 23 and 32 between the annular portion 20b and the fastening abutting portion 31 including the washer 30b. The opposite surfaces 23 formed on the annular portions 20a and 20b are end surfaces forming the notch portion 20n, 20o on the annular portions 20a and 20b and are particularly formed by using the end surfaces on the sides of the post insertion holes 20f and 20g in the second width direction Z. The opposite surface 32 formed on the fastening abutting portion 31 includes an end surface of the fastening abutting portion 31, particularly with the end surface on the post insertion hole 20f, 20g side in the second width direction Z. In the following description, the four pairs (1) to (4) of opposite surfaces 23 and 32 are provided in respective different positions; however, because the configurations of the opposite surfaces are substantially the same, the description will be shared by the four pairs without separating from one another. FIG. 5 schematically illustrates each configuration in a manner illustrating four pairs of opposite surfaces 23 and 32 on the same drawing.

The opposite surface 23 and the opposite surface 32 in this embodiment respectively form abutting surfaces 40 and 41 abuttable with each other on the slit 20h, 20i side in the first width direction Y with the fastening abutting portion 31 accommodated in the notch portion 20n, 20o and positioned. The abutting surface 40 is formed on the opposite surface 23 along the axis direction X and the first width direction Y. The abutting surface 41 is formed on the opposite surface 32 along the axis direction X and the first width direction Y with the fastening abutting portion 31 accommodated in the notch portion 20n, 20o and positioned. The abutting surface 40 and the abutting surface 41 are abuttable with each other in the state opposite to each other in the second width direction Z and substantially parallel with each other along the first width direction Y.

The relief surface 43 is provided on at least one of the opposite surface 23 and the opposite surface 32 such that a relief space 42 is formed with a clearance from the other one of the opposite surfaces. In this embodiment, the relief surface 43 is provided on the opposite surface 23. The relief surface 43 is provided on the opposite surface 23, particularly on the side opposite to the abutting surface 40 with respect to the slits 20h and 20i in the first width direction Y in a manner continuous from the abutting surface 40. The relief surface 43 is provided as a tapered surface (inclined surface) intersecting with the abutting surface 40 in a manner inclined to the abutting surface 40 on the opposite surface 23. The relief surface 43 is provided as a tapered surface inclined in a manner gradually separating from the opposite surface 32 along the second width direction Z with separation from the intersection with the abutting surface 40 along the first width direction Y. With this configuration, the relief surface 43 has a clearance between the relief surface 43 and the opposite surface 32 and accordingly has the relief space 42 in this clearance. The opposite surface 32 has a surface opposite to the relief surface 43 in the second width direction Z formed as a non-abutting surface 44. The non-abutting surface 44 is formed on the opposite surface 32, particularly on the side opposite to the abutting surface 41 with respect to the slits 20h and 20i in the first width direction Y in a manner continuous from the abutting surface 41. In this embodiment, the non-abutting surface 44 is formed as a surface on the same plane as the abutting surface 41. The non-abutting surface 44 is typically formed on the opposite surface 32 as a surface which does not abut with the opposite surface 23.

The above-described battery terminal 1 includes the main body 20 having post insertion holes 20f and 20g having the battery post 51 disposed therein and the slits 20h and 20i continuous to the post insertion holes 20f and 20g and the fastener 30 having a pair of fastening abutting portions 31 abutting the main body 20 from both sides in the first width direction Y, which is a direction intersecting with the axis direction X of the battery post 51 and crossing the slits 20h and 20i, with the slits 20h and 20i interposed therebetween along the first width direction Y and fastening the main body 20. The main body 20 includes the notch portion 20n, 20o formed at least on an end in the first width direction Y, accommodating one of the pair of fastening abutting portions 31, and positioning the fastening abutting portion 31. With the fastening abutting portion 31 accommodated in the notch portion 20n, 20o and positioned, the opposite surface 32 formed on the fastening abutting portion 31 side and the opposite surface 23 formed on the notch portion 20n, 20o side are opposite to each other in the axis direction X and the second width direction Z intersecting with the first width direction Y. With the fastening abutting portion 31 accommodated in the notch portion 20n, 20o and positioned, the opposite surface 23 is positioned opposite to the side closer to the post insertion holes 20f and 20g of the opposite surface 32 in the second width direction Z. The opposite surface 23 and the opposite surface 32 have abutting surfaces 40 and 41 abuttable with each other on the respective sides closer to the slits 20h and 20i in the first width direction Y. The relief surface 43 is provided on at least one of the opposite surface 23 and the opposite surface 32, and a relief space 42 is accordingly formed on the opposite sides of the abutting surfaces 40 and 41 with respect to the slits 20h and 20i in the first width direction Y with a clearance from the other one of the opposite surfaces.

In the state that the battery post 51 is disposed in the post insertion holes 20f and 20g formed on the main body 20, the battery terminal 1 can fasten the main body 20 to the battery post 51 with the main body 20 fastened by a pair of fastening abutting portions 31 of the fastener 30 from both sides in the first width direction Y with the slits 20h and 20i interposed therebetween. In this configuration, the opposite surfaces 23 and 32 between the notch portion 20n, 20o of the main body 20 and the fastening abutting portion 31 respectively include the abutting surfaces 40 and 41. With the abutting surfaces 40 and 41, the battery terminal 1 is capable of appropriately positioning the fastening abutting portion 31 accommodated in the notch portion 20n, 20o. For example, in screwing the nut 30c to the shaft portion 30d of the bolt 30a, abutment of the abutting surface 40 and the abutting surface 41 can prevent rotation of the fastening abutting portion 31 around the shaft portion 30d. The battery terminal 1 has the relief surface 43 provided on at least one of the opposite surfaces 23 and 32 such that the relief space 42 is formed with a clearance from the other one of the opposite surfaces. In fastening the fastened end 20m of the main body 20 with a pair of fastening abutting portions 31, even if the fastened end 20m of the main body 20 is deformed in the direction of fastening in a manner holding the battery post 51 as indicated by the arrow A in FIG. 5, a part of the deformed main body 20 can be released to the relief space 42 formed by the relief surface 43 as indicated by the arrow B in FIG. 5. In the battery terminal 1, the relief space 42 formed by the relief surface 43 exerts advantageous effects in preventing interference between the main body 20 and the fastening abutting portions 31, which can accordingly prevent an decrease in the fastening force of the pair of fastening abutting portions 31 fastening the main body 20 caused due to the interference between the main body 20 and the fastening abutting portions 31. This configuration allows the battery terminal 1 to appropriately secure the fastening force applied on the battery post 51. For example, compared with the configuration without the relief space 42 formed by the relief surface 43, the battery terminal 1 can increase the fastening force on the battery post 51 by around ten percent.

Furthermore, according to the above-described battery terminal 1, the fastener 30 has the shaft portion 30d provided to the main body 20 in a manner extended from an end of the main body 20 to the other end of the main body 20 along the first width direction Y across the slits 20h and 20i. One of the pair of fastening abutting portions 31 is provided to an end of the shaft portion 30d. On the fastening abutting portion 31, which is the bolt head 30e in this example, provided to the shaft portion 30d, the relief space 42 formed by the relief surface 43 exerts advantageous effects in preventing interference between the main body 20 and the bolt head 30e. This configuration allows the battery terminal 1 to secure appropriate fastening force.

Moreover, according to the above-described battery terminal 1, the notch portions 20n and 20o are formed on respective ends of the main body 20 on both sides in the first width direction Y, and the relief surfaces 43 are provided on the respective opposite surfaces 23 of the notch portions 20n and 20o. This configuration allows the battery terminal 1 to prevent the main body 20 and the fastening abutting portions 31 from interfering with each other on both ends in the first width direction Y as a fastening direction, and the fastening force is thus more appropriately and definitely secured.

The above-described embodiment is not intended to limit the battery terminal according to the embodiment of the present invention, and various changes can be made without departing from the scope of the claims.

Figure 6:
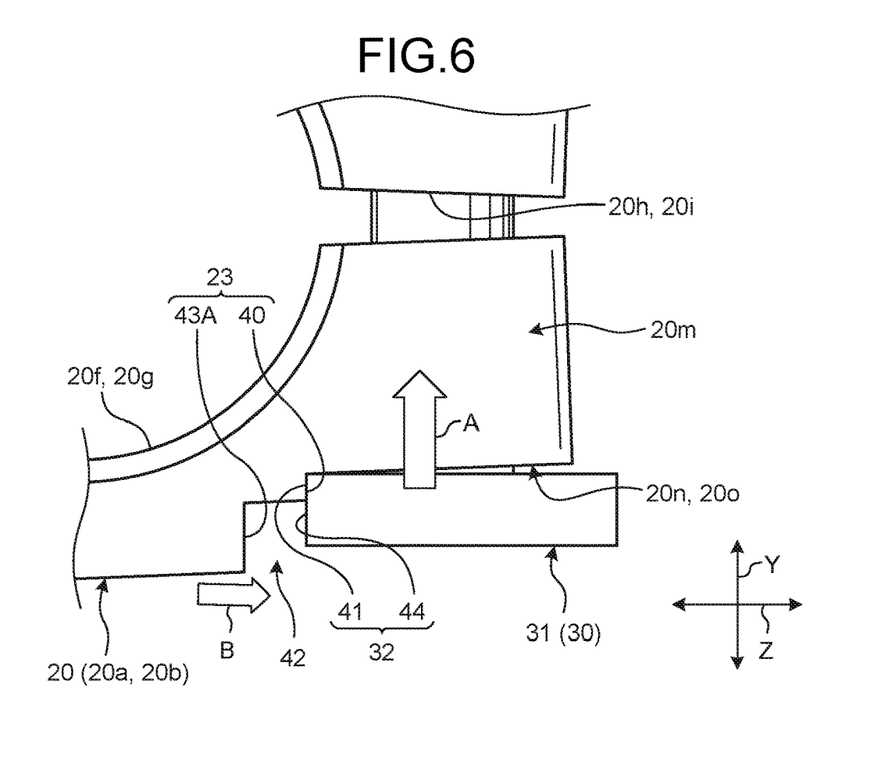
FIG. 6 is a partial planar view that includes a relief surface of a battery terminal according to a modification.
Figure 7:
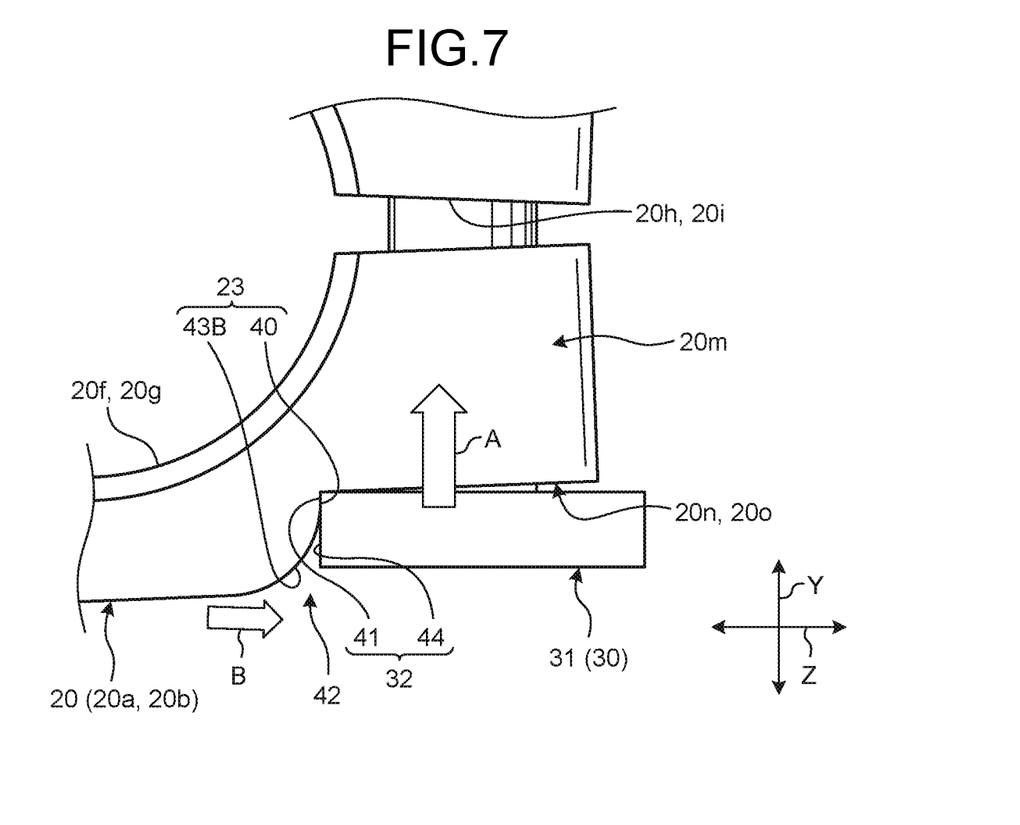
FIG. 7 is another partial planar view that includes a relief surface of a battery terminal according to another modification.

The relief surface 43 has been described as a tapered surface formed on the opposite surface 23 and intersecting with the abutting surface 40 in a manner inclined to the abutting surface 40; however, the embodiment is not limited to this configuration. A relief surface 43A according to a modification illustrated in FIG. 6 is formed as a stepped surface with respect to the abutting surface 40. A relief surface 43B according to another modification illustrated in FIG. 7 is formed as a curved surface continuous from the abutting surface 40 on the opposite surface 23. In either case, the relief space 42 can be formed with a clearance between the relief surface 43A or 43B and the opposite surface 32. In either case, even if the fastened end 20m of the main body 20 is deformed in the direction of fastening in a manner holding the battery post 51 as indicated by the arrow A in FIG. 6 and FIG. 7, a part of the deformed main body 20 can be released to the relief space 42 formed by the relief surface 43A or 43B as indicated by the arrow B in FIG. 6 and FIG. 7. This configuration allows the battery terminal 1 to secure appropriate fastening force.

The relief surface 43 has been provided on the opposite surface 23 in the above description; however, the embodiment is not limited thereto. The relief surface 43 may be provided on the opposite surface 32 or may be formed on both of the opposite surface 23 and the opposite surface 32.

Furthermore, the relief surface 43 has been provided for each of four pairs of opposite surfaces 23 and 32 in the above description; however, the embodiment is not limited to this configuration.

In the above description, the main body 20 has the pair of annular portions 20a and 20b, the pair of retaining board portions 20c and 20d, and the bent connection portion 20e integrally formed by, for example, pressing and bending a conductive metal plate; however, the embodiment is not limited to this configuration. Instead of having the bent connection portion 20e, for example, the main body 20 may be configured as a two-layered segment structure including an upper segment main body (the annular portion 20a and the retaining board portion 20c) and a lower segment main body (the annular portion 20b and the retaining board portion 20d) in the axis direction X and may integrate the separately formed upper segment main body and the lower segment main body with each other.

The fastener 30 described as above may be configured in such a manner that screws a nut or a bolt in or on a counterpart member along the axis direction X and generates the fastening force of a pair of fastening abutting portions.

In the state that the battery post is disposed in the post insertion holes formed on the main body, the battery terminal according to the present embodiment can fasten the main body to the battery post with the main body fastened by the pair of fastening abutting portions of the fastener from both sides in the fastening direction with the slits interposed therebetween. In this configuration, the notch-portion-side opposite surface and the abutting-portion-side opposite surface between the notch portion provided in the main body and the fastening abutting portion form respective abutting surfaces. The relief surface is provided on at least one of the opposite surfaces such that the relief space is formed with a clearance from the other one of the opposite surfaces. Even if the main body is deformed in fastening the main body with a pair of fastening abutting portions, this configuration can prevent interference between the main body and the fastening abutting portions. This configuration can therefore prevent a reduction in the fastening force of the pair of fastening abutting portions fastening the main body caused due to the interference between the main body and the fastening abutting portions, and the battery terminal can appropriately secure the fastening force on the battery post.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery terminal comprising:
a main body that has a post insertion hole in which a battery post is inserted and a slit being continuous to the post insertion hole; and
a fastener that has a pair of fastening abutting portions abutting and fastening the main body from both sides in a fastening direction interposing the slit along the fastening direction that is a direction intersecting with an axis direction of the battery post and crossing the slit, wherein
the fastener includes a shaft portion, a bolt head, a washer, and a nut,
the shaft portion is provided to the main body in a manner extended from an end of the main body to another end of the main body across the slit along the fastening direction,
one of the pair of fastening abutting portions is the bolt head that is connected to an end of the shaft portion,
another of the pair of fastening abutting portions is the washer,
the nut is screwed onto the shaft portion,
the main body has a notch portion that is provided in at least an end in the fastening direction and accommodates and positions one of the pair of fastening abutting portions,
the fastening abutting portion and the notch portion, with the fastening abutting portion accommodated in the notch portion and positioned, are abutted against each other in the fastening direction, an abutting-portion-side opposite surface being provided at the fastening abutting portion and a notch-portion-side opposite surface being provided at the notch portion are opposite to each other in an opposite direction intersecting with the axis direction and the fastening direction,
with the fastening abutting portion accommodated in the notch portion and positioned, the abutting-portion-side opposite surface and the notch-portion-side opposite surface form respective abutting surfaces abutting with each other,
the abutting surface of the notch-portion-side opposite surface abuts against the abutting surface of the abutting-portion-side opposite surface to prevent the rotation of the fastening abutting portion, and
a relief surface is provided on one of the abutting-portion-side opposite surface and the notch-portion-side opposite surface such that a relief space is formed with a clearance between the relief surface and a non-abutting surface of the other one of the notch-portion-side opposite surface and the abutting-portion-side opposite surface of at least one of the bolt head and the washer.

2. The battery terminal according to claim 1, wherein the main body further includes another notch portion, the notch portions are formed on respective ends on both sides in the fastening direction of the main body, and the relief surface is provided on the notch-portion-side opposite surface of one of the notch portions.

* * * * *